US011929555B2

(12) United States Patent
Yamada et al.

(10) Patent No.: US 11,929,555 B2
(45) Date of Patent: Mar. 12, 2024

(54) CIRCULAR POLARIZATION ARRAY ANTENNA DEVICE

(71) Applicant: Murata Manufacturing Co., Ltd., Nagaokakyo (JP)

(72) Inventors: Yoshiki Yamada, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 68 days.

(21) Appl. No.: 17/714,169

(22) Filed: Apr. 6, 2022

(65) Prior Publication Data

US 2022/0231428 A1 Jul. 21, 2022

Related U.S. Application Data

(63) Continuation of application No. PCT/JP2020/031597, filed on Aug. 21, 2020.

(30) Foreign Application Priority Data

Oct. 21, 2019 (JP) ................................ 2019-192023

(51) Int. Cl.
*H01Q 21/06* (2006.01)
*H01Q 21/24* (2006.01)

(52) U.S. Cl.
CPC ........... *H01Q 21/061* (2013.01); *H01Q 21/24* (2013.01)

(58) Field of Classification Search
CPC ...... H01Q 1/36; H01Q 9/0435; H01Q 21/061; H01Q 21/065; H01Q 21/24
See application file for complete search history.

(56) References Cited

U.S. PATENT DOCUMENTS

2005/0200531 A1* 9/2005 Huang ................. H01Q 19/026 343/893
2018/0069302 A1* 3/2018 Johansson .............. H01Q 1/246
(Continued)

FOREIGN PATENT DOCUMENTS

JP 53-39043 A 4/1978
JP 60-206207 A 10/1985
(Continued)

OTHER PUBLICATIONS

International Search Report and Written Opinion dated Nov. 2, 2020, received for PCT Application PCT/JP2020/031597, Filed on Aug. 21, 2020, 8 pages including English Translation.

*Primary Examiner* — Raymond R Chai
(74) *Attorney, Agent, or Firm* — XSENSUS LLP

(57) ABSTRACT

An antenna device is formed by arranging a plurality of radiation elements each radiating a circularly polarized wave in a matrix of three rows and ten columns. The plurality of radiation elements include radiation elements of four types having a positional relationship rotationally symmetric with each other. The plurality of radiation elements are included in a first element group in which radiation elements are arranged in a matrix of three rows and three columns in one end portion side and a second element group in which radiation elements are arranged in a matrix of three rows and three columns in the other end portion side. A first center element disposed at a center of the first element group is an element of a type obtained by rotating a second center element disposed at a center of the second element group by 180 degrees.

20 Claims, 5 Drawing Sheets

(56) References Cited

U.S. PATENT DOCUMENTS

2018/0145400 A1* 5/2018 Gabriel .................. H01Q 19/20
2020/0313294 A1* 10/2020 Morita ............... H01Q 21/0025
2022/0416406 A1* 12/2022 Varnoosfaderani .... H01Q 1/246

FOREIGN PATENT DOCUMENTS

JP 6-140835 A 5/1994
WO 2008/142900 A1 11/2008

* cited by examiner

120

CIRCULAR POLARIZATION ARRAY ANTENNA DEVICE

CROSS-REFERENCE TO RELATED APPLICATIONS

The present application is a continuation application of International Patent Application No. PCT/JP2020/031597, filed Aug. 21, 2020, which claims priority to Japanese Patent Application No. 2019-192023, filed Oct. 21, 2019, the entire contents of each of which being incorporated herein by reference.

TECHNICAL FIELD

The present disclosure relates to a circular polarization array antenna device.

BACKGROUND ART

The circular polarization array antenna is realized by arranging a plurality of radiation elements each radiating a circularly polarized wave in proximity to each other. In an ideal circularly polarized wave, a magnitude of a rotating electric field is constant, but in reality, the magnitude of the rotating electric field may not be constant and may be distorted into an elliptical shape. A ratio of a minor axis to a major axis of the elliptical shape of the circularly polarized wave is referred to as an "axial ratio". In order to make a circularly polarized wave an ideal circularly polarized wave, it is required to improve axial ratio characteristics.

As a technique for improving the axial ratio characteristics of the circular polarization array antenna, there is a technique called a sequential array. In the sequential array, a plurality of circularly polarized radiation elements are arranged while each of which is rotated at an arbitrary angle. It is known that such an arrangement may improve the axial ratio characteristics of the entire circular polarization array antenna even when the axial ratio characteristics or a single radiation element are not preferable.

Japanese Unexamined Patent Application Publication No. 6-140835 discloses a circular polarization array antenna device in which a plurality of circularly polarized radiation elements are arranged in a matrix. In this circular polarization array antenna, 16 circularly polarized radiation elements are sequentially arranged in a matrix of four rows and four columns (even-numbered rows and even-numbered columns) such that a positional relationship between adjacent radiation elements comes into a positional relationship in which the radiation elements are rotated by a predetermined angle with each other and translated.

CITATION LIST

Patent Document

Patent Document 1: Japanese Unexamined Patent Application Publication No. 6-140835

SUMMARY

Technical Problem

In a case that a plurality of circularly polarized radiation elements are arranged in a matrix, arranging the plurality of circularly polarized radiation elements in a matrix of even-numbered rows and even-numbered columns as in the circular polarization array antenna disclosed in Japanese Unexamined Patent Application Publication No. 6-140835 may more effectively improve the axial ratio characteristics.

However, the size of the circular polarization array antenna may be restricted depending on the size of a device to which the circular polarization array antenna is attached, and there may be a case that the number of rows of the arrangement has to be an odd number instead of an even number (that is, the number of radiation elements in a single column has to be an odd number). In this case, it is considered that improving the axial ratio characteristics is hard.

The present disclosure has been made in order to solve the problem above, and an object of the present disclosure is to make it simple to improve axial ratio characteristics even in the case that the number of rows of the arrangement is an odd number in a circular polarization array antenna device in which a plurality of radiation elements each capable of radiating a circularly polarized wave are arranged in a matrix.

Solution to Problem

A circular polarization array antenna device according to the present disclosure is a circular polarization array antenna device that is formed by arranging a plurality of elements each capable of radiating a circularly polarized wave in a matrix. When N is an odd number of three or more and M is an odd number of one or more, the plurality of elements are included in a first element group in which elements are arranged in a matrix of N rows and M columns in one end portion side of a region in which the plurality of elements are arranged, and a second element group in which elements are arranged in a matrix of N rows and M columns in the other end portion side of the region in which the plurality of elements are arranged. The plurality of elements include a plurality of types of elements having a positional relationship rotationally symmetric with each other. A first center element disposed at the center of the first element group is an element of a type obtained by rotating a second center element disposed at the center of the second element group by 180 degrees.

In the element unit described above, the first center element disposed at the center of the first element group arranged in a matrix of N rows and M columns (odd-numbered rows and odd-numbered columns) in one end portion side, and the second center element disposed at the center of the second element group arranged in a matrix of N rows and M columns (odd-numbered rows and odd-numbered columns) in the other end portion side are radiation elements of a type obtained by rotating one another by 190 degrees. With this, the first center element and the second center element may cancel out directivity distortion with each other. Consequently, an entire element group configured of a pair of the first element group and the second element group may be brought close to a sequential arrangement. Further, even when the number of rows of an arrangement, is an odd number, it may be made simple to improve the axial ratio characteristics.

Advantageous Effects

According to the present disclosure, in a circular polarization array antenna device in which a plurality of radiation elements each capable of radiating a circularly polarized wave are arranged in a matrix, it may be made simple to improve the axial ratio characteristics even when the number of rows of the arrangement is an odd number.

DESCRIPTION OF EMBODIMENTS

Figure 1:
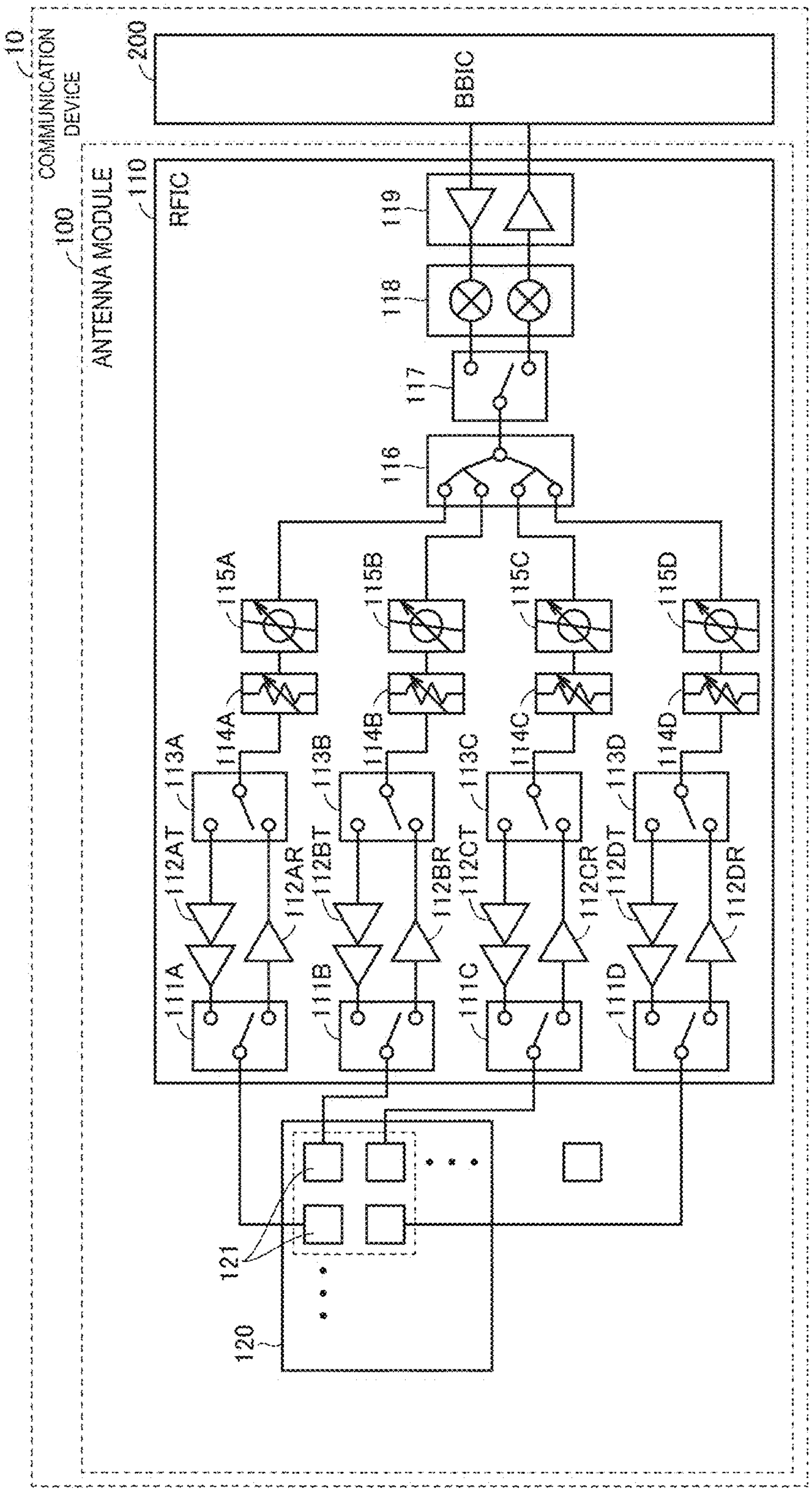
FIG. 1 is an example of a block diagram of a communication device to which an antenna device is applied.

Hereinafter, embodiments of the present disclosure will be described in detail with reference to the drawings. In the drawings, the same or corresponding portions are denoted by the same reference signs, and description thereof will not be repeated.

(Basic Configuration of Communication Device)

FIG. 1 is an example of a block diagram of a communication device 10 to which an antenna device 120 according to the present embodiment is applied. The communication device 10 is configured to be capable of transmitting a circularly polarized wave from the antenna device 120. The communication device 10 may be, for example, a terminal transmitting data to a wearable terminal (such as a head-mounted display, for example) whose relative position to the communication device 10 may change. In addition, the communication device 10 may be a communication terminal supporting "WiGig" which is a wireless communication standard mainly using 60 GHz band radio, for example.

The communication device 10 includes an antenna module 100 including the antenna device 120 and a BBIC 200 constituting a baseband signal processing circuit. The antenna module 100 includes an RFIC 110 that is an example of a power feeding component in addition to the antenna device 120. The communication device 10 up-converts a signal transferred from the BBIC 200 to the antenna module 100 into a radio frequency signal and radiates the radio frequency signal from the antenna device 120. The communication device 10 down-converts a radio frequency signal received by the antenna device 120 and processes the signal in the BBIC 200.

The antenna device 120 includes a plurality of radiation elements 121 each configured to be capable of radiating a circularly polarized wave. In FIG. 1, for ease of explanation, only a configuration corresponding to four radiation elements 121 among the plurality of radiation elements 121 included in the antenna device 120 is illustrated, and configurations corresponding to other radiation elements 121 having the same configuration are omitted. In the present embodiment, the radiation element 121 is a patch antenna having a substantially square flat plate shape.

The RFIC 110 includes switches 111A to 111D, 113A to 113D, and 117, power amplifiers 112AT to 112DT, low noise amplifiers 112AR to 112DR, attenuators 114A to 114D, phase shifters 115A to 115D, a signal multiplexer/demultiplexer 116, a mixer 118, and an amplifier circuit 119.

When transmitting a radio frequency signal, the switches 111A to 111D and 113A to 113D are switched to the power amplifiers 112AT to 112DT side, and the switch 117 is switched to a transmission-side amplifier in the amplifier circuit 119. When a radio frequency signal is received, the switches 111A to 111D and 113A to 113D are switched to the low noise amplifiers 112AR to 112DR side, and the switch 117 is switched to a reception-side amplifier in the amplifier circuit 119.

A signal transferred from the BBIC 200 is amplified by the amplifier circuit 119, and is up-converted by the mixer 118. The transmission signal, which is an up-converted radio frequency signal, is divided into four waves by the signal multiplexer/demultiplexer 116. The waves pass through four signal paths and are fed to the respective different radiation elements 121. At this time, by individually adjusting phase shift degrees in the phase shifters 115A to 115D disposed in respective signal paths, circularly polarized waves having the same phase are radiated from the antenna device 120.

Reception signals, which are radio frequency signals received by the radiation elements 121, pass through respective four different signal paths and are combined by the signal multiplexer/demultiplexer 116. The combined received signal is down-converted by the mixer 118, amplified by the amplifier circuit 119, and transferred to the BBIC 200.

The RFIC 110 is formed as a single chip integrated circuit component including the circuit configuration described above, for example. Alternatively, the devices (switches, power amplifiers, low noise amplifiers, attenuators, and phase shifters) corresponding to each radiation element 121 in the RFIC 110 may be formed as a single chip integrated circuit component for each corresponding radiation element 121.

(Antenna Device and Arrangement of Radiation Elements)

Figure 2:
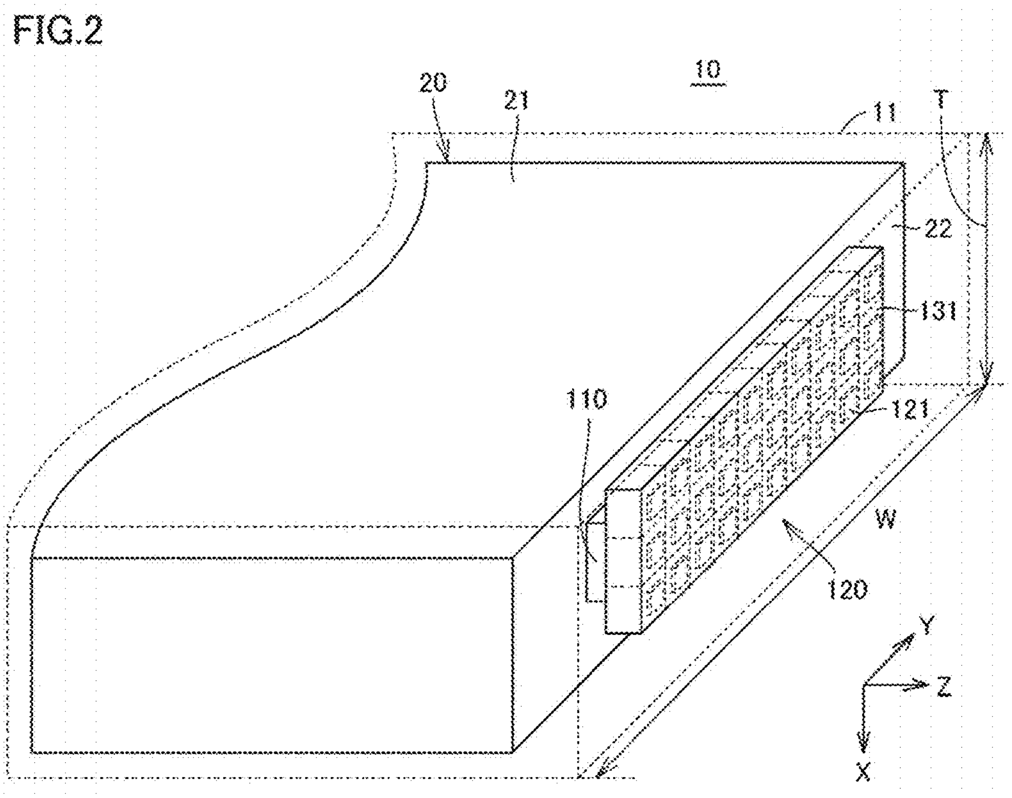
FIG. 2 is a transparent perspective view of the communication device illustrating the inside thereof.

FIG. 2 is a transparent perspective view of the communication device 10 illustrating the inside thereof. The communication device 10 is covered with a housing 11. The housing 11 accommodates the antenna device 120, the RFIC 110, a mounting substrate 20, and the like.

The antenna device 120 includes a plate-shaped dielectric substrate 131 having a multilayer structure, and the plurality of radiation elements 121 disposed inside the dielectric substrate 131. The dielectric substrate 131 is disposed on a side surface 22 of the mounting substrate 20 with the RFIC 110 interposed therebetween. Hereinafter, as illustrated in FIG. 2, a normal direction of the side surface 22 of the mounting substrate 20 is referred to as a "Z axis direction", a normal direction of a main surface 21 of the mounting substrate 20 is referred to as an "X axis direction", and a direction perpendicular to the Z axis direction and the X axis direction is referred to as a "Y axis direction".

The dielectric substrate 131 is provided with an antenna layer having an arrangement region in which the plurality of radiation elements 121 are arranged. In the arrangement region of the antenna layer, the plurality of radiation elements 121 are arranged in a matrix along the X axis direction and the Y axis direction. Specifically, 30 radiation elements 121 are arranged in a matrix of three rows and ten columns with the X axis direction being a "row" and the Y axis direction being a "column".

In general, in a case that a plurality of circularly polarized radiation elements are arranged in a matrix, arranging the plurality of circularly polarized radiation elements in a matrix of even-numbered rows and even-numbered columns, such as in the circular polarization array antenna disclosed in Japanese Unexamined Patent Application Publication No. 6-140835, may more effectively improve the axial ratio characteristics.

However, in the antenna device 120 according to the present embodiment, a length of the dielectric substrate 131 in the X axis direction is limited by a thickness (length in the X axis direction) T of the housing 11. Because of this limitation, in the antenna device 120 according to the present embodiment, the number of rows at which the plurality of radiation elements 121 are arranged is three rows (odd-numbered rows). Accordingly, without any countermeasures, it may be hard to improve the axial ratio characteristics as compared with the case that the plurality of radiation elements 121 are arranged in a matrix of even-numbered rows and even-numbered columns.

Then, in the antenna device 120 according to the present embodiment, arranging the plurality of radiation elements 121 in the following manner makes it simple to improve the axial ratio characteristics even in the case that the number of rows at which the plurality of radiation elements 121 are arranged is three rows (odd-numbered rows).

Figure 3:
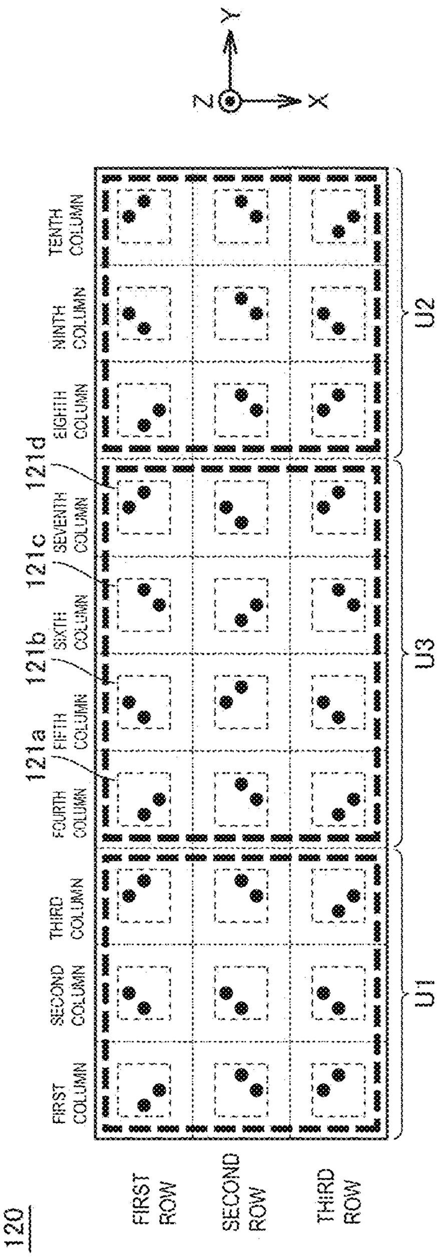
FIG. 3 is a diagram illustrating an arrangement of a plurality of radiation elements in the antenna device.

FIG. 3 is a diagram illustrating an arrangement of the plurality of radiation elements 121 in the antenna device 320 according to the present embodiment. In the present embodiment, the 30 radiation elements 121 are arranged in a matrix of three rows and ten columns, as described above. Each radiation element 121 has two feed points. Two radio frequency signals having a phase difference of 90° relatively to each other are supplied from a hybrid circuit which is not illustrated, for example, to the two feed points of each radiation element 121. With this, a circularly polarized wave is radiated from each radiation element 121.

The 30 radiation elements 121 include radiation elements of four types having a positional relationship rotationally symmetric with each other. That is, the 30 radiation elements 121 include a plurality of first type radiation elements 121*a*, a plurality of second type radiation elements 121*b*, a plurality of third type radiation elements 121*c*, and a plurality of fourth type radiation elements 121*d*.

The first type radiation element 121*a* includes a feed point disposed at a negative direction side of the Y axis relative to a surface center, and a feed point disposed at a positive direction side of the X axis relative to the surface center. The second type radiation element 121*b* is obtained by rotating the first type radiation element 121*a* clockwise by 90 degrees and translating the rotated first type radiation element 121*a*. The third type radiation element 121*c* is obtained by rotating the first type radiation element 121*a* clockwise by 270 degrees and translating the rotated first type radiation element 121*a*. The fourth type radiation element 121*d* is obtained by rotating the first type radiation element 121*a* clockwise by 130 degrees with the surface center being a rotational axis, and translating the rotated first type radiation element 121*a*.

With the rotation position (rotation angle) of the first type radiation element 121*a* being "reference (0 degrees)", the clockwise rotation position of each radiation element 121 is expressed as follows. The rotation position of the second type radiation element 121*b* is "90 degrees", the rotation position of the third type radiation element 121*c* is "270 degrees", and the rotation position of the fourth type radiation element 121*d* is "180 degrees". In light of the above, the phase shift degrees of the phase shifters 115A to 115D are individually adjusted as follows when the phase of a signal supplied to the first type radiation element 121*a* is expressed as a "reference phase". The phase of a signal supplied to the second type radiation element 121*b* is "reference phase minus 90 degrees", the phase of a signal supplied to the third type radiation element 121*c* is "reference phase minus 270 degrees", and the phase of a signal supplied to the fourth type radiation element 121*d* is "reference phase minus 180 degrees". With this, circularly polarized waves of the same phase are radiated from the respective radiation elements 121 of the antenna device 120.

Hereinafter, among the 30 radiation elements 121, the nine radiation elements 121 arranged in first to third columns in a left end portion are also referred to as a "first element group U1", the nine radiation elements 121 arranged in eighth to tenth columns in a right end portion are also referred to as a "second element group U2", and the 12 radiation elements 121 arranged in fourth to seventh columns in a center portion are also referred to as a "third element group U3". Further, in the following description, any integer from 1 to 3 is denoted by n, any integer from 1 to 4 is denoted by m, and a position of the n-th row and the m-th column in a matrix is denoted by (n×m).

Figure 4:
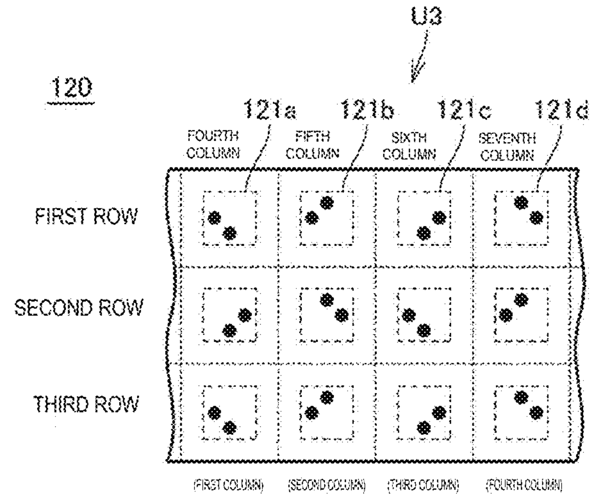
FIG. 4 is a partially enlarged view illustrating an arrangement of the radiation elements in a third element group disposed in a center portion of the antenna device.

FIG. 4 is a partially enlarged view illustrating an arrangement of the radiation elements 121 in the third element group U3 disposed in the center portion of the antenna device 120. The 12 radiation elements 121 included in the third element group U3 include three sets of the radiation elements 121*a* to 121*d* of four types.

The first type radiation element 121*a* is disposed at (1×1), (2×3), and (3×1) of the third element group U3. The second type radiation element 121*b* is disposed at (1×2), (2×4), and (3×2) of the third element group U3. The third type radiation element 121*c* is disposed at (1×3), (2×1), and (3×3) of the third element group U3. The fourth type radiation element 121*d* is disposed at (1×4), (2×2), and (3×4) of the third element group U3. First to fourth columns of the third element group U3 are the fourth to seventh columns of the entire antenna device 120.

With the arrangement above, in the third element group U3, any one radiation element 121 and the radiation elements 121 disposed around (vertically, horizontally, and obliquely) the one radiation element 121 are of different types from each other. With this, in the third element group U3, the radiation elements 121*a* to 121*d* of four types are uniformly and sequentially arranged in the same number (three each), and overall balance is achieved. Consequently, it may be made simple to improve the axial ratio characteristics.

However, the first element group U1 in the left end portion and the second element group U2 in the right end portion are both arranged in a matrix of three rows and three columns (odd-numbered rows and odd-numbered columns) and include the nine (odd number) radiation elements 121. In the first element group U1 and the second element group U2, therefore, the radiation elements 121*a* to 121*d* of four types cannot be uniformly arranged in the same number as in the third element group U3. This generates a portion in which radiation elements of the same type are adjacent to each other. Thus, each of the first element group U1 and the second element group U2 alone cannot form a sequential arrangement as in the third element group U3.

Then, in the present embodiment, the first element group U1 in the left end portion and the second element group U2 in the right end portion are regarded as a pair of element groups, and the radiation element 121 at the center of the first element group U1 and the radiation element 121 at the center of the second element group U2 are rotated one another by 180 degrees. That is, the radiation element 121 disposed at the center of the first element group U1 (hereinafter also referred to as a "first center element") is the radiation element 121 of a type obtained by rotating the radiation element 121 disposed at the center of the second element group U2 (hereinafter also referred to as a "second center element") by 180 degrees. With this, the first center element and the second center element may cancel out the directivity distortion with each other, with the same number (two) of radiation elements 121*a* to 121*d* of four types being disposed at positions other than the center in each of the first element group U1 and the second element group U2. Consequently, the entire element group configured of the pair of the first element group U1 and the second element group U2 may be brought close to the sequential arrangement, and therefore, the axial ratio characteristics may be improved.

Figure 5:
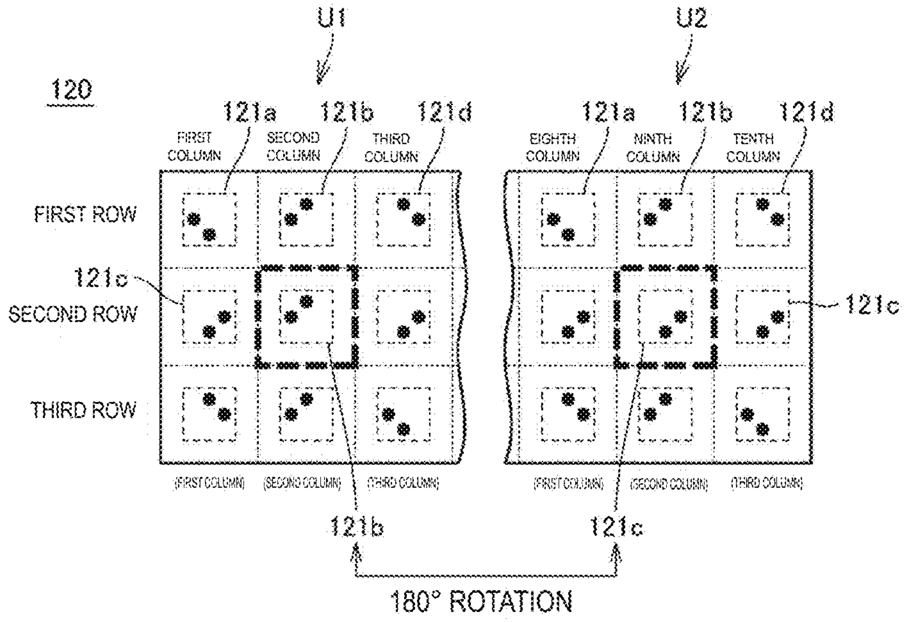
FIG. 5 is a partially enlarged view illustrating an arrangement of the radiation elements in a first element group and a second element group respectively disposed in a left end portion and a right end portion or the antenna device.

FIG. 5 is a partially enlarged view illustrating an arrangement of the radiation elements 121 in the first element group U1 and the second element group U2 respectively disposed in the left end portion and the right end portion of the antenna device 120.

The first type radiation element 121*a* is disposed at (1×1), and (3×3) of the first element group U1. The second type radiation element 121*b* is disposed at (1×2), and (3×2) of the first element group U1. The third type radiation element 121*c* is disposed at (2×1), and (2×3) of the first, element group U1. The fourth type radiation element 121*d* is disposed at (1×3), and 3×1 of the first element group U1.

Similarly, the first type radiation element 121*a* is disposed at (1×1), and (3×3) of the second element group U2. The second type radiation element 121*b* is disposed at (1×2), and (3×2) of the second element group U2. The third type radiation element 121*c* is disposed at (2×1), and (2×3) of the second element group U2. The fourth type radiation element 121*d* is disposed at (1×3), and (3×1) of the second element group U2. Note that, first to third columns of the second element group U2 are the eighth to tenth columns of the entire antenna device 120.

With the arrangement above, in each of the first element group U1 and the second element group U2, the same number (two) of the radiation elements 121*a* to 121*d* of four types are disposed at positions other than the center (2×2), and adjacent, radiation elements are of different types.

Further, in the center (2×2) of the first element group U1, the second type radiation element 121*b* is arranged as the first center element. In the center (2×2) of the second element group U2, the third type radiation element 121*c* obtained by rotating the second type radiation element. 121*b*, which is the first center element, by 180 degrees is disposed as the second center element. With the arrangement above, the first center element is the same type as the second type radiation elements 121*b* adjacent in the upper and lower side in the first element group U1, and the second center element is the same type as the third type radiation element 121*c* adjacent in the right and left side in the second element group U2. However, since the first center element and the second center element are the radiation elements 121 of a type obtained by rotating one another by 180 degrees, the first center element and the second center element may cancel out the directivity distortion with each other. Consequently, the entire element group configured of the pair of the first element group U1 and the second element group U2 may be brought close to the sequential arrangement, and therefore, the axial ratio characteristics may be improved.

As described above, the antenna device 120 according to the present embodiment is formed by arranging the plurality of radiation elements 121 each radiating a circularly polarized wave in a matrix of three rows and ten columns. The plurality of radiation elements 121 include the radiation elements 121*a* to 121*d* of four types having a positional relationship rotationally symmetric with each other.

The plurality of radiation elements 121 are included in the first element group U1 arranged in a matrix of three rows and three columns in one end portion side, the second element group U2 arranged in a matrix of three rows and three columns in the other end portion side, and the third element group U3 arranged in a matrix of three rows and four columns in the center portion between the first element group U1 and the second element group U2.

In the third element group U3 in the center portion, the radiation elements 121*a* to 121*d* of four types are uniformly and sequentially arranged in the same number (three each). With this, the overall balance is achieved in the third element, group U3, and it may be made simple to improve the axial ratio characteristics.

Whereas, each of the first element, group U1 and the second element group U2 does not form the sequential arrangement alone. Considering this, the first element group U1 and the second element group U2 are regarded as a pair of element groups, and the first center element and the second center element are made to be the radiation element 121 of a type obtained by rotating one another by 180 degrees. With this, the first center element and the second center element may cancel out the directivity distortion with each other, with the same number (two) of the radiation elements 121*a* to 121*d* of four types being disposed at positions other than the center in each of the first element group U1 and the second element group U2. Consequently, the entire element group configured of the pair of the first element group U1 and the second element group U2 may be brought close to the sequential arrangement, and therefore, the axial ratio characteristics may be improved.

Consequently, in the antenna device 120 in which the plurality of radiation elements 121 each capable of radiating a circularly polarized wave are arranged in a matrix, even when the number of rows of the arrangement is three rows (odd number), it may be made simple to improve the axial ratio characteristics.

The "antenna device 120" and the "plurality of radiation elements 121" according to the present embodiment may correspond to the "circular polarization array antenna device" and the "plurality of elements" of the present disclosure, respectively. The "first element group U1", the "second element group U2", and the "third element group U3" according to the present embodiment may correspond to the "first element group", the "second element group", and the "third element group" of the present disclosure, respectively. The "second type radiation element 121*b*" disposed at the center (2×2) of the first element group U1 and the "third type radiation element 121*c*" disposed at the center (2×2) of the second element group U2 according to the present embodiment may correspond to the "first center element" and the "second center element" of the present disclosure, respectively. Further, the "first type radiation element 121*a*", the "second type radiation element 121*b*", the "third type radiation element 121*c*", and the "fourth type radiation element. 121*d*" according to the present embodiment may correspond to the "first type element", the "second type element", the "third type element", and the "fourth type element" of the present disclosure, respectively.

<Modification 1>

In the embodiment described above, there has been described an example in which each of the first element group U1 and the second element group U2 is arranged in a matrix of three rows and three columns. However, it is sufficient that the first element group U1 and the second element group U2 are arranged Ln a matrix of N rows and M columns with which N is an odd number of three or more and M is an odd number of one or more, and the first element group U1 and the second element group U2 are not necessarily limited to three rows and three columns.

Figure 6:
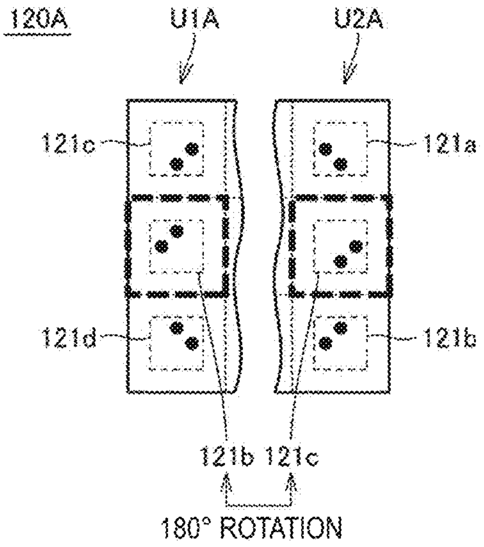
FIG. 6 is a partially enlarged view illustrating an arrangement of the radiation elements in a first element group in the left end portion and a second element group in the right end portion of an antenna device according to Modification 1.

FIG. 6 is a partially enlarged view illustrating an arrangement of radiation elements 121 in a first element group U1A in a left end portion and a second element group U2A of a right end portion of an antenna device 120A according to Modification 1.

Each of the first element group U1A and the second element group U2A is arranged in a matrix of three rows and one column. The third type radiation element 121*c* is disposed at (1×1) of the first element group U1A. The fourth type radiation element 121*d* is disposed at (3×1) of the first element group U1A. The first type radiation element 121*a* is disposed at (1×1) of the second element group U2A. The second type radiation element 121*b* is disposed at (3×1) of the second element, group U2A. With the arrangement above, the same number (one) of the radiation elements 121*a* to 121*d* of four types are arranged at four corners of the pair of element groups of the first element group U1 and the second element group U2.

Further, in the center (2×1) of the first element group U1A, the second type radiation element 121*b* is disposed as the first center element. In the center (2×1) of the second element group U2A, the third type radiation element 121*c* obtained by rotating the second type radiation element 121*b*, which is the first center element, by 180 degrees is disposed as the second center element. With the arrangement above, the first center element and the second center element may cancel out the directivity distortion with each other. Consequently, the entire element group configured of the pair of the first element group U1 and the second element group U2 may be brought close to the sequential arrangement, and therefore, the axial ratio characteristics may be improved.

The "first element group U1A" and the "second element group U2A" according to Modification 1 may correspond to the "first element group" and the "second element group" of the present disclosure, respectively.

<Modification 2>

In the embodiment described above, an example has been described in which the third element group U3 arranged in a matrix of three rows and four columns is disposed between the first element group U1 and the second element group U2. However, it is sufficient that the third element group U3 is arranged in a matrix of odd-numbered rows and even-numbered columns, and the number of rows and the number of columns of the third element group U3 are not necessarily limited to "three rows" and "four columns" described above.

Further, only the first element group U1 and the second element group U2 may be included without including the third element group U3.

<Modification 3>

In the embodiment described above, there has been described the radiation element 121 of the two-point feed system as the circularly polarized radiation element. However, a radiation element of a single point feed system, which uses degeneracy obtained by making the shape of the radiation element, asymmetric, nay be used as a circularly polarized radiation element.

<Modification 4>

In the embodiment described above, there has been described an example in which the radiation element 121 is a patch antenna. However, it is sufficient that the radiation element 121 is an antenna capable of radiating a circularly polarized wave, and the radiation element 121 is not necessarily limited to a patch antenna. For example, the radiation element 121 may be a slot antenna.

It should be understood that the embodiment disclosed herein is exemplary and non-restrictive in every respect. The scope of the present disclosure is indicated by the scope of claims rather than the description of the embodiment described above, and it is intended to include all modifications within the meaning and range of equivalency of the scope of claims.

The invention claimed is:

1. A circular polarization array antenna device, comprising:
- a plurality of elements arranged in a matrix and each configured to radiate a circularly polarized wave, wherein
- when N is an odd number of three or more and M is an odd number of one or more,
- the plurality of elements are included in
  - a first element group in which elements are arranged in a matrix of N rows and M columns in one end portion side of a region in which the plurality of elements are arranged, and
  - a second element group in which elements are arranged in a matrix of N rows and M columns in another end portion side of the region in which the plurality of elements are arranged, and
- the plurality of elements include a plurality of types of elements having a positional relationship rotationally symmetric with each other, and
- a first center element disposed at a center of the first element group is an element of a type obtained by rotating a second center element disposed at a center of the second element group by 180 degrees.

2. The circular polarization array antenna device of claim 1, wherein
- the plurality of elements include elements of four different types.

3. The circular polarization array antenna device of claim 2, wherein the elements of four types include
- a first type element,
- a second type element obtained by rotating the first type element by 90 degrees in a predetermined direction,
- a third type element obtained by rotating the first type element by 270 degrees in the predetermined direction, and
- a fourth type element obtained by rotating the first type element by 180 degrees in the predetermined direction.

4. The circular polarization array antenna device of claim 3, wherein
- each of the first element group and the second element group includes elements arranged in a matrix of three rows and three columns.

5. The circular polarization array antenna device of claim 4, wherein
- two sets of the elements of four types are disposed at positions other than the center of the first element group.

6. The circular polarization array antenna device of claim 5, wherein
- two sets of the elements of four types are disposed at positions other than the center of the second element group.

7. The circular polarization array antenna device of claim 6, wherein the first center element disposed at the center of the first element group is an element of any of the four types.

8. The circular polarization array antenna device of claim 7, wherein the second center element disposed at the center of the second element group is an element of a type obtained by rotating the first center element by 180 degrees.

9. The circular polarization array antenna device of claim 3, wherein each of the first element group and the second element group includes elements arranged in a matrix of three rows and one column.

10. The circular polarization array antenna device of claim 9, wherein, elements of different types are disposed at positions other than the center of the first element group and at positions other than the center of the second element group.

11. The circular polarization array antenna device of claim 10, wherein the first center element disposed at the center of the first element group is an element of any of the four types.

12. The circular polarization array antenna device of claim 11, wherein the second center element disposed at the center of the second element group is an element of a type obtained by rotating the first center element by 180 degrees.

13. The circular polarization array antenna device of claim 1, wherein the circular polarization array antenna device further includes a third element group in which elements are arranged in a matrix.

14. The circular polarization array antenna device of claim 13, wherein the third element group is disposed between the first element group and the second element group.

15. The circular polarization array antenna device of claim 3, wherein the circular polarization array antenna device further includes a third element group which is disposed between the first element group and the second element group.

16. The circular polarization array antenna device of claim 15, wherein the third element group includes elements arranged in a matrix of three rows and four columns, when any integer from 1 to 3 is denoted by n, any integer from 1 to 4 is denoted by m, and a position of an n-th row and an m-th column in a matrix is denoted by (n×m), the first type element is disposed at (1×1), (2×3), and (3×1) of the third element group, the second type element is disposed at (1×2), (2×4), and (3×2) of the third element group, the third type element is disposed at (1×3), (2×1), and (3×3) of the third element group, and the fourth type element is disposed at (1×4), (2×2), and (3×4) of the third element group.

17. A circular polarization array antenna device, comprising:

a mounting substrate;

a first plurality of antenna elements arranged in a matrix of N rows and M columns in proximity to a first end of the mounting substrate, where N is an odd number of three or more and M is an odd number of one or more, and a second plurality of antenna elements arranged in a matrix of N rows and M columns in proximity to a second end of the mounting substrate, wherein the first and second plurality of elements include a plurality of types of elements having a positional relationship rotationally symmetric with each other, and a first center element disposed at a center of the first plurality of antenna elements is an element of a type obtained by rotating a second center element disposed at a center of the second plurality of antenna elements group by 180 degrees.

18. The circular polarization array antenna device of claim 17, wherein the first plurality of antenna elements and the second plurality of antenna elements include antenna elements of four different types including a first type element, a second type element obtained by rotating the first type element by 90 degrees in a predetermined direction, a third type element obtained by rotating the first type element by 270 degrees in the predetermined direction, and a fourth type element obtained by rotating the first type element by 180 degrees in the predetermined direction.

19. The circular polarization array antenna device of claim 18, wherein two sets of the antenna elements of four types are disposed at positions other than the center of the first plurality of antenna elements, and two sets of the antenna elements of four types are disposed at positions other than the center of the second plurality of antenna elements.

20. The circular polarization array antenna device of claim 17, wherein each of the first plurality of antenna elements and the second plurality of antenna elements includes elements arranged in a matrix of three rows and three columns.

* * * * *